No. 646,207. Patented Mar. 27, 1900.
J. P. B. FISKE.
APPARATUS FOR HANDLING BRICKS.
(Application filed Nov. 27, 1899.)
(No Model.)
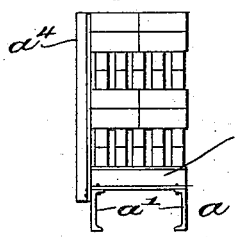
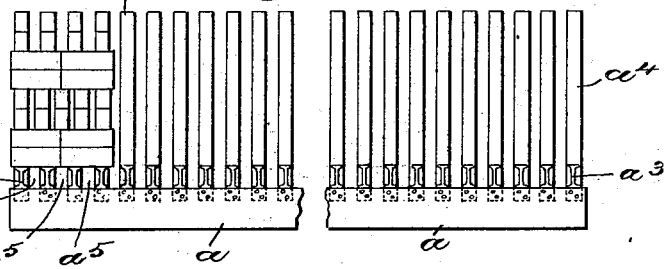
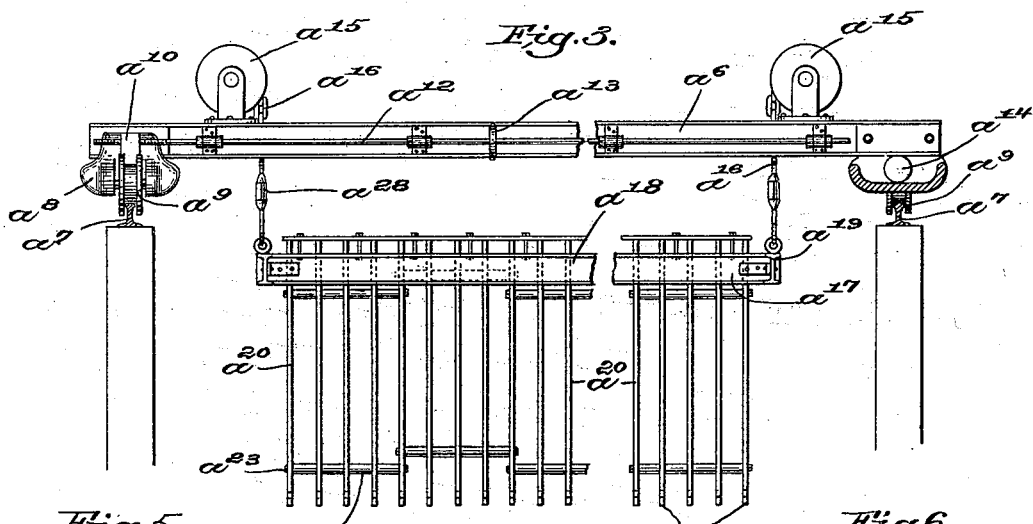
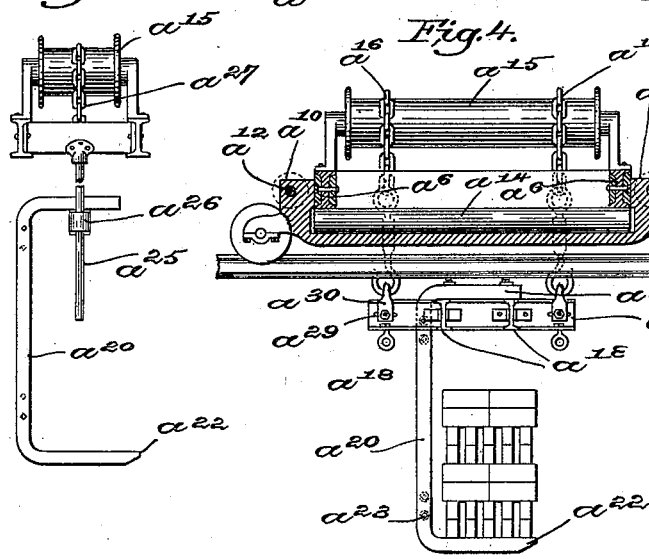
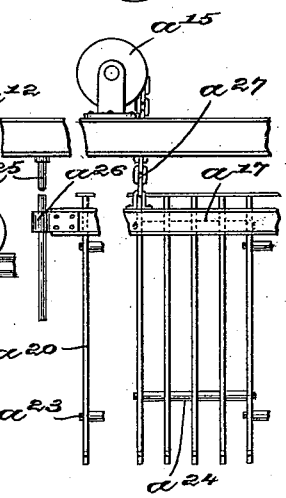
Witnesses.
Thomas J. Drummond.
George L. Dolbeare
Inventor.
Jonathan P. B. Fiske,
by Crosby & Gregory
Attys.
THE NORRIS PETERS CO., PHOTO-LITHO., WASHINGTON, D. C.

UNITED STATES PATENT OFFICE.

JONATHAN P. B. FISKE, OF NEWTON, MASSACHUSETTS.

APPARATUS FOR HANDLING BRICKS.

SPECIFICATION forming part of Letters Patent No. 646,207, dated March 27, 1900.

Application filed November 27, 1899. Serial No. 738,352. (No model.)

*To all whom it may concern:*

Be it known that I, JONATHAN P. B. FISKE, a citizen of the United States, residing at Newton, county of Middlesex, State of Massachusetts, have invented an Improvement in Apparatus for Handling Bricks in the Manufacture of the Same, of which the following description, in connection with the accompanying drawings, is a specification, like letters on the drawings representing like parts.

My present invention is an apparatus for handling bricks, and while primarily intended for use in handling green bricks as they are received from the brick-making machine it is not limited to this use, but in certain of its features is capable of extended use in handling bricks at any stage of their manufacture or, in fact, in handling the finished bricks wherever it may be found desirable to handle them in large bodies.

In the manufacture of bricks it is essential that the green bricks should not be disturbed any more than is absolutely necessary, inasmuch as the corners and edges are very liable to be chipped off and the bricks otherwise disfigured and distorted, and accordingly I have heretofore devised mechanism for manufacturing bricks practically without manual handling thereof, the bricks being maintained in unit stacks and handled by machinery from the beginning to the end of the manufacturing process. Inasmuch, however, as it is essential in order that the large stacks of bricks required for the burning-kiln shall be properly stacked for burning that the green bricks should be stacked with extreme accuracy and should be maintained so stacked without any disturbance of their said accurate arrangement, I have deemed it advisable to provide the herein-described apparatus whereby the green bricks are stacked on a stacking-station or receiving-platform having guides or spacing-aliners which not only serve to aid the eye of the stacker, (provided they are stacked by hand,) but also guide the lifting device and prevent any accidental abrasion of the bricks or unevenness in movement and operation, and coöperating therewith I provide a lifter having fingers or arms which are adapted to enter between the said guides or aliners of the station, said lifter also being specially constructed so that no possible twisting or swinging or tipping movement can take place as the stack of bricks is being transported thereby into the drying or burning kiln or elsewhere.

I will set forth the details of construction and operation of my invention in the following description, reference being had to the accompanying drawings, illustrative of one embodiment of my invention, and the latter will be more particularly defined in the appended claims.

In the drawings, Figure 1 shows my improved stacking-station in end elevation. Fig. 2 shows the same in front elevation, parts being broken away, said figure also showing a few bricks stacked thereon to show the manner of use thereof. Fig. 3 is a front elevation of my new lifting device, parts being broken away and the right-hand end thereof being in section to show the details of construction. Fig. 4 is an end elevation looking toward the left end of Fig. 3, a portion of the carriage being vertically sectioned. Figs. 5 and 6 are details in end and front elevation, respectively, of a modified construction.

It will be understood that the green bricks are made in any usual or preferred manner by means of a brick-machine or otherwise, and it may be are delivered on a usual separating-belt, from which they are placed in stack formation on the stacking stand or station.

Referring to Figs. 1 and 2, it will be seen that the stacking stand or station is composed of a suitable base $a$, herein shown as formed of two channel-beams $a'$, arranged facing each other, (see Fig. 1,) on which are secured cross-beams, ridges, or projections $a^3$, spaced apart preferably so that two cross-beams serve to support the length of one brick, as shown in Fig. 2.

At the rear of the base $a$ I bolt or otherwise secure vertical guides or, as I term them, "spacing-aliners" $a^4$, herein shown in the form of angle-irons, these guides or aliners having a width corresponding to the width of the I beams or ridges $a^3$ and being spaced apart the same as the beams $a^3$. Thus when the special lifting device, presently to be explained, enters at $a^5$ beneath the bricks (see Fig. 2) there is no possibility that the teeth or arms of the lifter can come in contact with the flanges at the upper sides of the ridges $a^3$, so as to give a jar to the bricks, nor can the said arms of the lifter possibly move otherwise than truly vertical as they lift the green bricks, inasmuch as they are guided unvaryingly by the aliners $a^4$.

The lifter (shown in Figs. 3 and 4) is of the overhead-crane variety, although it will be understood that I do not limit my invention to all the details, arrangements, and relations herein explained, inasmuch as many changes and variations may be made without departing from the scope of my invention.

As herein shown, the crane-carriage $a^6$ runs on tracks $a^7$, the carriage having special trucks $a^8$ at its ends, whose flanged rollers $a^9$ inclose the tracks $a^7$. The trucks $a^8$ are adjustable relatively to the carriage, being provided with threaded bearings $a^{10}$, in which operate one or more rods $a^{12}$, rotated by any suitable means, as by a hand-wheel $a^{13}$, whereby the carriage may be shifted on both trucks simultaneously, an interposed roller $a^{14}$ or other shifting device being provided in order to permit the heavy weight of the truck to be readily changed in position to a slight extent relatively to the trucks, this provision being made in order to accommodate the lifter to the slightly-varying positions required of it in receiving and placing the bricks properly in a kiln.

Preferably adjacent its opposite ends the crane-carriage has chain-drums $a^{15}$, on which are wound suitable lifting-chains $a^{16}$ in opposite pairs, (see Fig. 4,) said chains at their lower ends being connected to a carrying-frame $a^{17}$, which rigidly supports the lifting-arms or carrying devices provided for engaging and lifting a stack of bricks. The frame $a^{17}$ is preferably composed of opposite longitudinally-extending I-beams $a^{18}$, having adjacent their ends similar cross-beams $a^{19}$, and the carrying devices are shown in the form of U-shaped hooks $a^{20}$, whose upper ends $a^{21}$ project over and parallel to the lower ends $a^{22}$, said hooks or arms being spaced apart to correspond to the alining plates $a^4$ of the support and held rigidly in said spaced-apart position by any suitable means, as by usual bolts $a^{23}$ and spacing-sleeves $a^{24}$, (to which, however, I make no claim.) One main object of this construction is to provide a lifting device which will necessarily be perfectly steady and level at all times without any possibility of twisting or swinging, and this object is secured in the construction already explained by reason of the fact that at each of its four corners the lift proper or series of hooked arms is provided with a lifting-chain, and these four chains being raised and lowered simultaneously give absolute steadiness and precision of movement.

It will be understood that I have omitted the motor and such usual features of cranes as may be employed without forming a part of my invention, and also it will be understood that I am not limited as to the precise location of the lifting-chains and other various features so long as they perform the desired purpose of insuring perfect steadiness and certainty of movement, as explained. The main object may, however, be attained by various other means, and accordingly in Figs. 5 and 6 I have shown means for maintaining the lifting device steady and level in the form of guide-rods $a^{25}$, it being understood that there is one of these rods at each end of the frame $a^{17}$, and the frame is provided with a guide-eye $a^{26}$, riding on each rod, and in this construction the lift may have only one chain $a^{27}$, located at the center of the lift, it being understood that the major part of the lift is broken away in Fig. 6 for convenience of space.

A lift constructed as above explained is exceedingly light, strong, and convenient, being easily and quickly moved from place to place, while at the same time it is capable of lifting a long row of stacked bricks without the slightest danger of their being disturbed either in being raised, being carried, or in being deposited again.

While I have shown one form of special truck and carriage, it will be understood that I am not limited thereto for all purposes, inasmuch as the provision of means for maintaining the lifting device steady and level under all conditions is an important feature in and of itself, whether used with the particular carriage, &c., herein shown or not.

Preferably I provide in the lifting chain or chains suitable adjusting devices, turnbuckles $a^{28}$ being shown for the purpose, by means of which extreme accuracy of leveling may be secured. Further accuracy of movement is provided for by a lateral adjustment of the lower ends of the chains, slots $a^{29}$ being herein shown as formed in the cross-beams $a^{19}$, in which the stirrups $a^{30}$ or other chain connections are laterally adjustable.

When it is desired to remove a stack of bricks from the station, the projecting ends $a^{22}$ of the lifting device are entered in the spaces $a^5$ beneath the bricks, the lifting-arms passing between the aliners $a^4$ of the stacking-station, and then the hoist is operated, the steadying means, whether it be the plurality of chains $a^{16}$ or the special guiding devices $a^{25}$ $a^{26}$ or other means, serving to maintain the entire stack of bricks from end to end and from side to side in perfectly-undisturbed relation, so that a load of many tons of green or other bricks may thus be raised and transported without danger, and also the aliners $a^4$ of the stacking-station serve a most important purpose in aiding the person who stacks the bricks to get the bricks in perfectly-stacked position. In order that this feature of my invention may be properly apprehended, it may be well for me to explain that when bricks are stacked in a burning-kiln they are stacked much higher than it is possible to stack the green bricks in a drier or drying-kiln, inasmuch as the green or soft bricks if stacked to such a height would crush under the superimposed load, whereas after they have been dried they are strong enough to sustain a much greater load. However, in order thus to stack the bricks in a burning-kiln by machinery—e. g., by means of a lifting device such as shown herein—it is of course obvious that the lifting device must take from the drier one load of dried bricks—such, for instance, as indicated in Fig. 1—and having deposited this load at the bottom of a kiln the lifting device brings another similar load to be placed on top of the previously-deposited load; but if now the top layer of bricks on the first-deposited load have become disarranged in any respect or were not properly placed by the stacker it is evident that the teeth or arms of the lifting device cannot pass down between said top layer of bricks in order to deposit the second load thereon and be removed from under the same. For this reason it is absolutely essential that the persons stacking the bricks originally should space the top row of green bricks with absolute accuracy to correspond to the spacing of the lifting-arms, and for this reason the spacing-aliners $a^4$ are very important.

As already explained, I do not limit myself to the precise mechanism herein shown nor otherwise than as hereinafter expressed in the claims.

Having described my invention, what I claim, and desire to secure by Letters Patent, is—

1. In an apparatus for handling bricks, a stacking-station having ledges spaced apart to correspond to the requirements of stacking, a lifting device having lifting-arms similarly spaced apart to enter between said ledges, and spacing-aliners secured to said station in alinement with said ledges, and extending vertically above the same at one end thereof, whereby the person stacking the bricks is enabled to place the top row of bricks in accurate alinement with said ledges to correspond with the spacing of said lifting device, substantially as described.

2. In an apparatus for handling bricks, a stacking-station having ledges spaced apart as required for stacking purposes, the intervals between said ledges being sufficient to permit the entrance thereinto of lifting-arms, combined with spacing-aliners separated from each other to guide the stacker in placing the bricks, substantially as described.

3. In an apparatus for handling bricks, a stacking-station having ledges spaced apart to correspond to the requirements of stacking, said ledges being composed of I-beams and having vertical spacing-aliners extending flush with the edges of said I-beams, substantially as described.

4. In an apparatus for handling bricks, a stacking-station having ledges spaced apart to correspond to the requirements of stacking, said ledges being formed of I-beams and having angle-irons secured at the ends of said I-beams, said angle-irons presenting a flat alining face the same in width as said I-beams, substantially as described.

5. In an apparatus for handling bricks, a lifting device comprising a plurality of freely-projecting lifting arms or hooks spaced apart according to the requirements of the bricks, means for transporting said lifting device, and means connected with said lifting device and with said transporting means for raising and maintaining said lifting device steady and level when loaded, substantially as described.

6. In an apparatus for handling bricks, a lifting device comprising a plurality of freely-projecting lifting arms or hooks spaced apart according to the requirements of the bricks, means for transporting said lifting device, means for raising and maintaining said lifting device steady and level when loaded, and means for accurately leveling said lifting device, substantially as described.

7. In an apparatus for handling bricks, a lifting device comprising a series of separated hooks having freely-projecting lower ends to engage and lift the bricks, combined with front and rear lifting chains or cables, and means for adjusting the lower ends of said chains or cables laterally with relation to said lifting device, substantially as described.

8. In an apparatus for handling bricks, a lifting device comprising a series of freely-projecting arms spaced apart for engaging and lifting stacked bricks, a carriage, hoisting means on said carriage for raising said lifting device, trucks supporting said carriage, and means for shifting said carriage on said trucks, substantially as described.

9. In an apparatus for handling bricks, a lifting device comprising a series of freely-projecting arms spaced apart for engaging and lifting stacked bricks, a carriage, hoisting means on said carriage for raising said lifting device, said hoisting means including three or more chains or cables secured to said lifting device at separated points, whereby the lifting device is maintained level and steady in its movement, substantially as described.

10. In an apparatus for handling bricks, a lifting device comprising a series of U-shaped lifting arms or hooks, said hooks being spaced apart for engaging and lifting stacked bricks, and having their lower ends projecting freely to engage the bricks, and their upper ends extending approximately parallel to said lower ends, and separated supporting-beams extending lengthwise of the lift and transversely of the upper ends of said hooks for lifting said hooks, combined with means for raising said lifting device, substantially as described.

11. In an apparatus for handling bricks, a lifting device comprising a series of U-shaped lifting arms or hooks, said hooks being spaced apart for engaging and lifting stacked bricks, and having their lower ends projecting freely to engage the bricks, and their upper ends extending approximately parallel to said lower ends, and a frame for carrying said series of hooks, said frame comprising longitudinal beams separated from each other and engaging the upper ends of said hooks each at two points, and cross-beams joining said longitudinal beams together, combined with lifting means, substantially as described.

12. In an apparatus for handling bricks, a lifting device comprising a series of U-shaped lifting arms or hooks, said hooks being spaced apart for engaging and lifting stacked bricks, and having their lower ends projecting freely to engage the bricks, and their upper ends extending approximately parallel to said lower ends, and a frame for carrying said series of hooks, said frame comprising longitudinal beams separated from each other and engaging the upper ends of said hooks each at two points, and cross-beams joining said longitudinal beams together, and three or more chains or cables secured to said frame at separated points for lifting the same and maintaining the lifting device level and steady in operation, substantially as described.

13. In an apparatus for handling bricks, a lifting device comprising a series of U-shaped lifting arms or hooks, said hooks being spaced apart for engaging and lifting stacked bricks, and having their lower ends projecting freely to engage the bricks, and their upper ends extending approximately parallel to said lower ends, and separated supporting-beams extending lengthwise of the lift and transversely of the upper ends of said hooks for lifting said hooks, and three or more separated chains or cables secured to said supporting-beams for raising said lifting device and maintaining it level and steady in operation, substantially as described.

In testimony whereof I have signed my name to this specification in the presence of two subscribing witnesses.

JONATHAN P. B. FISKE.

Witnesses:
  GEO. H. MAXWELL,
  FREDERICK L. EMERY.